United States Patent [19]

Currie et al.

[11] Patent Number: 4,594,540

[45] Date of Patent: Jun. 10, 1986

[54] ANGULAR MEASUREMENT SYSTEM

[75] Inventors: James R. Currie; Ralph R. Kissel, both of Huntsville, Ala.

[73] Assignee: The United States of America as represented by the Administrator of the National Aeronautics and Space Administration, Washington, D.C.

[21] Appl. No.: 657,309

[22] Filed: Oct. 3, 1984

[51] Int. Cl.[4] .............................................. G05B 1/06
[52] U.S. Cl. ............................. 318/661; 340/347 SY; 340/347 CC; 318/636; 318/605
[58] Field of Search ............... 318/661, 636, 605, 654, 318/562; 328/151; 329/50; 340/347 SY, 870.21, 870.34, 347 CC

[56] References Cited

U.S. PATENT DOCUMENTS

| | | | |
|---|---|---|---|
| 3,600,694 | 8/1971 | McCollum | 318/654 X |
| 4,062,005 | 12/1977 | Freed | 340/198 |
| 4,207,505 | 6/1980 | Falck | 318/661 X |
| 4,270,077 | 5/1981 | Swartz et al. | 318/661 |
| 4,334,179 | 6/1982 | Grimes et al. | 318/661 |
| 4,358,723 | 11/1982 | Scholl | 318/661 |
| 4,528,511 | 7/1985 | Smith | 329/50 |

Primary Examiner—William M. Shoop, Jr.
Assistant Examiner—Patrick Keane
Attorney, Agent, or Firm—Joseph H. Beumer; John R. Manning; Leon D. Wofford, Jr.

[57] ABSTRACT

A system for measurement of shaft angles wherein a synchro resolver (10) is sequentially pulsed, and alternately, a sine (32) and then a cosine (36) representative voltage output of it are sampled. Two like type, sine or cosine, succeeding outputs ($V_{S1}$, $V_{S2}$) are averaged and algebraically related to the opposite type output pulse ($V_c$) occurring between the averaged pulses to provide a precise indication of the angle of a shaft (18) coupled to the resolver (10) at the instant of the occurrence of the intermediately occurring pulse ($V_c$).

8 Claims, 2 Drawing Figures

ANGULAR MEASUREMENT SYSTEM

ORIGIN OF THE INVENTION

The invention described herein was made by employees of the United States Government and may be manufactured and used by or for the government of the United States of America for governmental purposes without the payment of any royalties thereon or therefor.

TECHNICAL FIELD

This invention relates generally to devices for the measurement of mechanical shaft angles, and particularly to the employment of output signals of synchro type resolvers for this purpose.

BACKGROUND ART

Synchro devices, such as synchro resolvers, are widely utilized in the indication of measurement of the angular position of a shaft or other rotatable member. Normally, the rotor winding of a synhcro resolver is excited by a sinusoidal voltage. This voltage couples to a set of output windings which provide separate output voltages proportional to the sine and cosine of the angle at which the rotor is positioned. Conventionally, these output voltages are converted to D.C. signals proportional to the respective sine and cosine values and are of a polarity in accordance with whether the output voltage is in phase or out of phase with the exitation voltage. Further, conventionally, bulky and expensive synchronous demodulators are employed to make this conversion to D.C. As a means of overcoming these disadvantages, it has been previously proposed, e.g, in U.S. Pat. Nos. 4,270,077 and 4,334,179, that one may do away with synchronous demodulators by exciting the rotor winding of a synchro resolver with a pulse and computing shaft angle from the amplitude of the resulting pulse shaped voltages induced into the stationary windings. As is commonplace in data systems handling any different signals, with respect to which sine and cosine signal values are only two, signals are fed through an analog multiplexer and then processed on a serial basis by a central signal processor or computer. This means that sampled voltages are obtained at different times. Insofar as the two sine and cosine signals we are dealing with, it means that they do not necessarily reflect the same shaft position and thus some error is introduced in the computation of a shaft angle. While perhaps in many applications the error is not significant, there are still many applications where precision of resolution, for example, on the order of 1 to 2 minutes of arc, are essential. Applicants find that in order to reliably accomplish this, improved circuitry is required.

Accordingly, it is the object of this invention to provide a synchro resolver type angular measurement system with enhanced accuracy and in addition one which is readily adaptable to employment with a variety of synchro reslvers which, for example, may be adapted to normally operate at a variety of frequencies, for example, 60 cycle or 400 cycle, with minimal circuit adjustment.

SUMMARY OF THE INVENTION

In accordance with this invention, an input winding of a synchro resolver is excited by a pulse having an upper region which has a distinct, linearly increasing slope on the order of 10° to 30°. Two 9° displaced output windings of the resolver respond by providing pulse outputs wherein the levels of the upper portions of the pulses are indicative of sine and cosine values, respectively, of resolver angle. By virtue of a linear and positive inclination to the input pulse, it has been found that the output pulses may generally be held quite linear and with little amplitude variation. Despite the latter, there does typically occur some change in amplitude, and where extreme accuracy of measurement is necessary, significant errors may still occur. This is particularly the case where in keeping with the practice describe above where sine and cosine values are sequentially sampled. Applicants have solved this problem by the combination of two features. One, as stated above, while the pulse supplied to the resolver may vary some in amplitude during a period of measurement, this variation is made linear. Second, relying on this linearity, three measurement samples are taken sequentially. The first sample, for example, a sine sample, is taken at a time $T_1$, and it is added to a second sine sample taken at time $T_3$. A cosine sample is then taken at a time $T_2$, halfway in time between sample times $T_1$ and $T_3$. Next, the sine values are averaged by summing them and dividing by 2. After this, the average sine value is divided by the cosine value and, thereby there is obtained a value representative of the tangent of the shaft angle of the resolver. From it, the arc tangent is obtained as a signal representative of shaft angle in radians. Alternately, the cosine values could have been sampled at times $T_1$ and $T_3$ and averaged and the sine value sampled at time $T_2$. By this system of computation, and wherein the same computational system processes both sine and cosine values, circuitry induced errors, such as produced by amplifier gains are divided out.

DESCRIPTION OF THE PREFERRED EMBODIMENT

Figure 1:
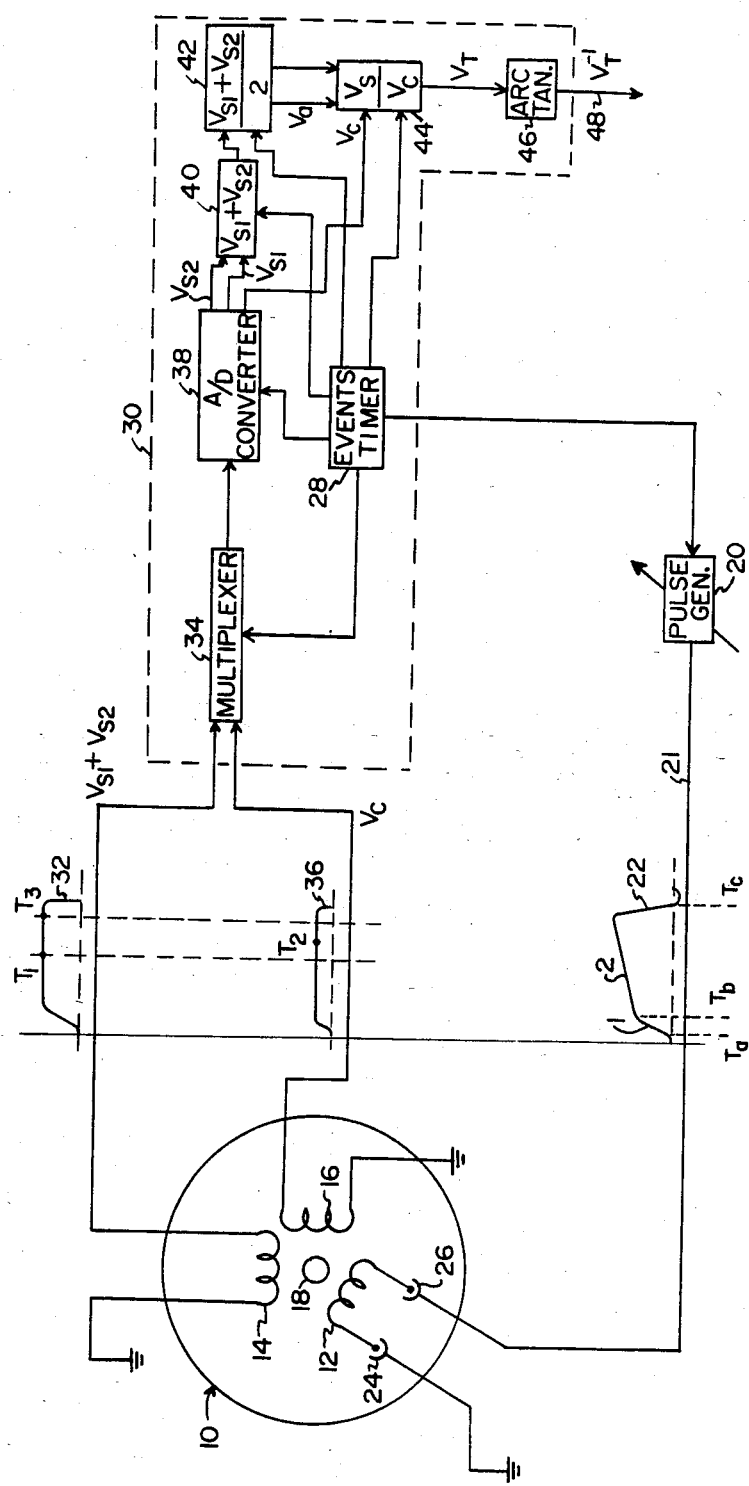
FIG. 1 is an electrical diagram, partially in block form, of an embodiment of the invention.

Referring to FIG. 1, synchro resolver 10 is comprised of a rotor winding 12 and stator windings 14 and 16 wherein the rotary winding is mechanically wound with and coupled to a shaft 18, the angle of which is to be measured. The stator windings are relatively oriented at 90°, with winding 14 regarded as providing a sine output and winding 16 regarded as providing a cosine output. Each of the windings is connected to a common ground as shown. Pulse generator 20 supplies an electrical pulse 22 on lead 21 through conventional slip ring assemblies 24 and 26 to winding 12, a pulse being provided as an output in response to and during a trigger pulse input from events timer 28 of data system 30 which generally, and in a conventional manner, provides timing pulses to the other circuitry elements shown as appropriate for their operation.

Responsive to input pulse 22, output winding 14 provides a sine representative output pulse 32, and it is fed to, and appears at an input of, analog multiplexer 34. Output winding 16 provides a cosine output pulse 36 to analog multiplexer 34. Analog multiplexer 34 is conventional and is timed by events timer 28, a conventionally constructed computer type timing control, to sequentially provide samples of signal values of output pulses 32 and 36 at selected times. Here it is triggered by events timer 28 to provide a first sample output at time $T_1$ of sine output pulse 32; then, at time $T_2$ to provide an output of cosine output pulse 35; and finally, at time $T_3$ to provide a value of sine output pulse 32. These three outputs, $V_{S1}$ $V_C$ and $V_{S2}$ occurring at multiplexed times $T_1$, $T_2$ and $T_3$, respectively, are fed to A-D converter 38 which discretely samples each and converts it into a digital value. The sampled values $V_{S1}$ and $V_{S2}$ of sine pulse 32 are fed to digital adder 40 which, as illustrated, sums $V_1 + V_2$, and this sum is then fed to divider 42 which divides the sum of $V_{S1} + V_{S2}$ by 2 to provide an average output $V_S$ to divider 44. Additionally, output $V_C$ from A-D converter 38, representative of the sampled cosine output of winding 36 at time $T_2$, is provided divider 44, which then divides the output of divider 42 by the cosine output $V_C$.

Divider 44 provides as an output $V_T$, representative of the tangent of the angular position of shaft 18. As stated above, since each signal value passes through the same electronic channels, the signal values $V_1$, $V_2$ and $V_3$ are all subjected to the same circuit effects; and, by virtue of the division in divider 44, these effects are divided out to make $V_T$ truly representative of the sample outputs of windings 14 and 16 as effected by the computation shown. The output $V_T$ is then fed to arc tangent computer 46 which converts the signal to $V_T^{-1}$ representative of shaft angle, this appearing on output lead 48 in radians.

As stated, events timer 28 is a conventional program timer and operates in a manner to control the discrete circuit elements shown to effect the computations in the indicated order. Actually, in practice, the computational elements consisting of adder 40, divider 42, divider 44, and arc tangent computer 46 would be comprised of a single computing microprocessor under the control of events timer 28.

Figure 2:
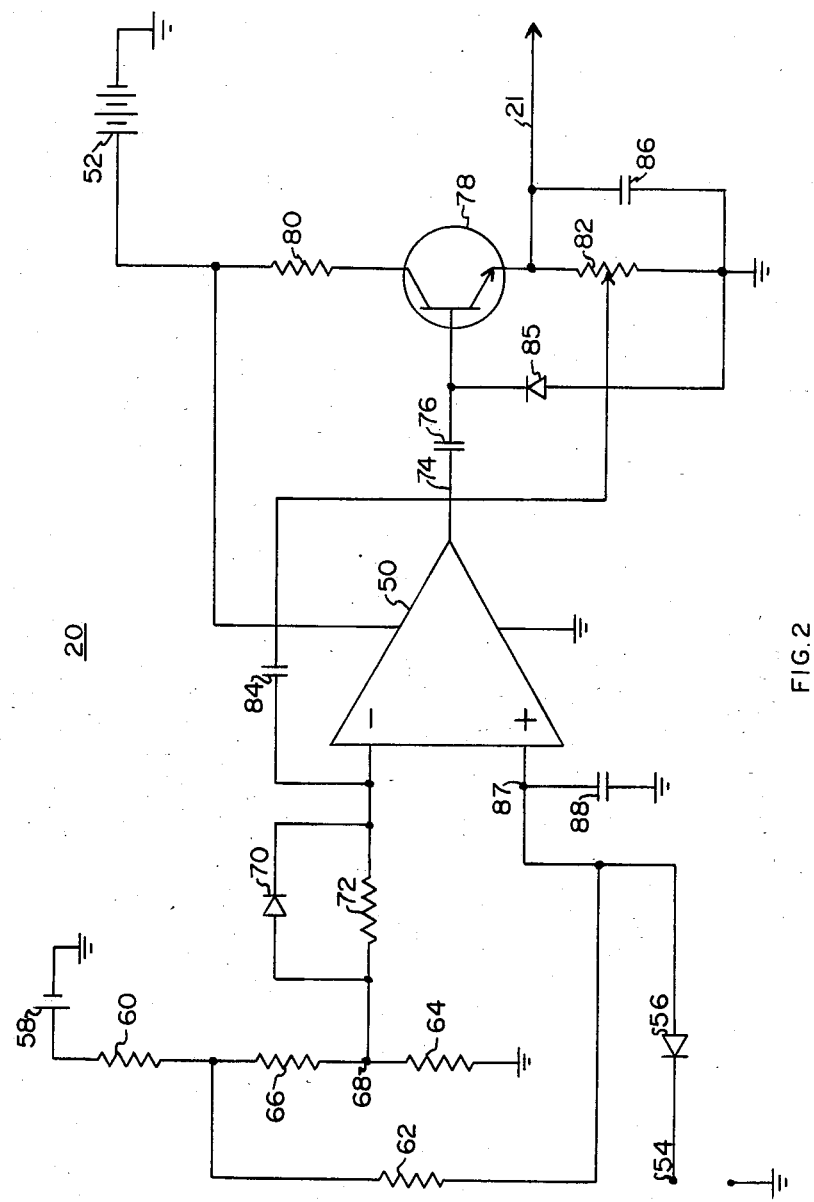
FIG. 2 is an electrical schematic diagram of the pulse generator indicated by a block in FIG. 1.

Pulse generator 20 is shown in detail in FIG. 2. It is adapted to provide the two slopes, slope 1 and slope 2. Slope 1 is particularly adapted to reduce the steepness of the leading edge of pulse 22 to thereby prevent ringing or oscillations in the windings of resolver 10. The second slope, slope 2, is of a linear and selectable slope adaped to enable a constant level output for the top portion of the output pulses of windings 14 and 16.

Pulse generator 20 employs an operational amplifier 50, which is biased by a single positive operating bias from 24 volt D.C. source 52. Normally, with a 0 potential on input lead 54, about 0.6 volts is applied on the non-inverting input of operational amplifier 50, this bias occurring across diode 56 and being supplied from +5 volts source 58 through resistors 60 and 62.

The inverting input of operational amplifier 50 is normally biased from an approximately 2.0 volt positive input across resistor 64 powered through resistors 60 and 66 at point 68 from +5 volts source 58. This voltage is applied to the inverting input through resistor 72. Diode 70 is employed to speed discharge of capacitor 84 at the end of an input pulse. With the static condition described, that is, with a 0.6 input voltage on the non-inverting input and the approximately 2.0 volts applied on the inverting input of operational amplifier 50, the output of operational amplifier 50 will be low, essentially 0 to 2 volts.

The output lead 74 of operational amplifier 50 is connected through capacitor 76 to the base input of NPN transistor 78. The collector of this transistor is biased from +24 volts supply 52 through power limiting resistor 80, and the emitter is connected to ground through potentiometer 82, the center and adjustable tap of which is connected through capacitor 84 back to the inverting input of operational amplifier 50 as an integrative, inverse feedback, voltage. Diode 85, poled as indicated, is connected between ground and the intersection between the base of transistor 78 and capacitor 76 functions as a discharge of capacitor 76.

The output of the pulse generator is taken across potentiometer 82 on lead 21 from the emitter of transistor 78, and capacitor 86 is connected across this output to reduce system noise.

As stated, with a 0.6 volt input on the non-inverting input and a significant positive input on the inverting input, the output of operational amplifier 50 is low, the resulting input on transistor 78 is low, and there a low or essentially 0 output on output lead 21. Upon the application of a positive pulse input $V_O$ on lead 54 to diode 56, for example, e.g., approximately 4.5 volts, diode 56 will be blocked, and capacitor 88 will commence charging through resistors 60 and 62. When this charging voltage at point 87 crosses the 2 volt bias on the inverting input of operational amplifier 50, the output of operational amplifier 50 commences to rise, initially following the slope times gain of the charging voltage on capacitor 88. The output voltage on lead 21 reflects this by the portion of the output waveform of pulse 22 from point $T_a$ to point $T_b$, tracking the input voltage across capacitor 88. The rise time from $T_a$ to $T_b$ is adjustable from 50 to 200 micro-seconds by selecting a value for capacitor 88. After capacitor 88 is sufficiently charged, the slope of the output voltage on lead 21 is controlled by integrating capacitor 84 and resistor 72. This slope, slope 2, a portion of the output pulse, is generally between $T_b$ and $T_c$. The slope is adjustable from 0.1 volt/millisecond to 15 volts/millisecond. The gain setting of the circuit determined by the setting of potentiometer 82, which adjusts negative feedback. When the voltage presented by capacitor 84 on the inverting input reaches the value of the charging source at point 68, diode 70 is blocked and there is a transition between the relatively steep front of the first slope portion of pulse 22 from $T_a$ to $T_b$, and the second slope portion from point $T_b$ to $T_c$. The second slope portion 2 occurs as capacitor 84 charges through resistors 64 and 72. The magnitude of the second slope portion is a function of the value of capacitor 84. Capacitor 84 is typically selected to effect a minimum change in level of the top portions of sine and cosine output pulses 32 and 36. Potentiometer 82 is used to set the amplitude of slope 2 of pulse 22 to match the characteristics of the resolver with which it is employed.

Where desired, an additional output may be taken from the emitter of transistor 78, typically provided through a selected resistance to provide a selected level of input to a second resolver of a multi-speed resolver assembly, often employed where both coarse and fine adjustment or measurement synchro resolvers are used.

Pulse generator 20, by providing the initial slope, from point $T_a$ to point $T_b$, effectively reduces ringing effects which occur in a resolver to an exceedingly low level.

In general, the system of this invention enables an extremely accurate measurement of a shaft angle. In a system where A-D converter 38 was a 12 bit A-D converter designed to convert +5 volts with 2.441 millivolts resolution, a worst case state still enabled an accuracy within 1.318 arc minutes. Further, this was with a pulse input drift state of +10 volts. The circuitry is simple and inexpensive, and it is believed will have wide application in angle measurement equipment. One illustration of its usage has been in the measurement of an anemometer shaft angle used in connection with a particle counter in research in outer space. It is to be appreciated, however, that its more mundane usages will be quite substantial in view of its basically low cost and yet high accuracy.

We claim:

1. A shaft angle measurement system comprising:
rotary transformer means having a rotatable winding coupled to a shaft and first and second stationary windings relatively displaced 90°;
exitation means for generating a linear, selectively variable, increasing slope pulse signal, said pulse signal being connected to said rotatable winding;
signal means for sequentially sampling the outputs of said first and second stationary windings and said first and second stationary windings providing discrete signal outputs representative of the sine and cosine of the angle of said shaft; and
computation means responsive to the average of successive outputs of one of said stationary windings and an intermediately, in time, occurring output of the other of said windings for computing the angular position of said shaft.

2. A system as set forth in claim 1 wherein said average output is the average of successive outputs of said first winding, sine outputs, and the output of said second winding is a cosine output, and said computation means includes means for effecting division between said average output and the output of said second winding.

3. A system as set forth in claim 2 wherein said average output is divided by the output of said second winding.

4. A system as set forth in claim 3 wherein said slope is variable in the range of approximately 10° to 30°.

5. A system as set forth in claim 4 wherein said exitation means comprises a dual slope pulse generator in turn comprising means for generating a leading edge of a said pulse having a slope of 0.1 volt/millisecond to 15 volts/millisecond transitioning into said selectively variable slope.

6. In a synchro resolver angular measurement system having a rotor input winding adapted to be excited by a pulse voltage signal and a set of stationary output windings adapted to provide separate output voltage proportional to the sine and cosine of the angle at which the rotor is positioned, a method of obtaining enhanced rotor shaft position accuracy, comprising:
providing sequentially a pulse voltage signal having a distinct linearly increasing slope to said rotor input winding;
sequentially sampling the voltage output of said output windings to provide a first output pulse from one winding at one time, and a second output pulse from said one winding at a later time, and a first output pulse from a second winding at a time intermediate of the times of said first and second pulses from said one winding,
averaging said first and second output pulse of said one winding and dividing that average by said first pulse of said second winding to obtain a value representative of the shaft angle of the rotor for which circuitry induced errors are divided out.

7. In a synchro resolver angular measurement system, the method according to claim 6, further comprising:
said pulse voltage to said rotor input winding having a linearly increasing slope in the range of approximately 10° to 30°.

8. In a synchro resolver angular measurement system, the method according to claim 6 further comprising:
said output pulses from said one and second windings are converted into digital values before the steps of averaging and dividing.

* * * * *